(12) United States Patent
Khurana et al.

(10) Patent No.: US 7,817,995 B2
(45) Date of Patent: Oct. 19, 2010

(54) SYSTEMS AND METHODS FOR SCHEDULING THE RECORDING OF AUDIO AND/OR VISUAL CONTENT

(75) Inventors: Sanjay Khurana, Oakton, VA (US);
Robert Cerbone, Kensington, MD (US);
Beverly Ann Murdock, Leesburg, VA (US)

(73) Assignee: Nextel Communications Company L.P., Reston, VA (US)

( * ) Notice: Subject to any disclaimer, the term of this patent is extended or adjusted under 35 U.S.C. 154(b) by 1600 days.

(21) Appl. No.: 11/095,622

(22) Filed: Apr. 1, 2005

(65) Prior Publication Data

US 2006/0253886 A1 Nov. 9, 2006

(51) Int. Cl.
*H04M 5/761* (2006.01)
*H04M 11/00* (2006.01)

(52) U.S. Cl. .................. 455/420; 455/403; 455/418; 455/419; 455/414.1; 725/58

(58) Field of Classification Search ............... 455/414.1
See application file for complete search history.

(56) References Cited

U.S. PATENT DOCUMENTS

| | | | |
|---|---|---|---|
| 6,614,774 B1* | 9/2003 | Wang | 370/338 |
| 6,865,191 B1* | 3/2005 | Bengtsson et al. | 370/475 |
| 7,107,017 B2* | 9/2006 | Koskelainen et al. | 455/90.2 |
| 2003/0237093 A1* | 12/2003 | Marsh | 725/46 |
| 2004/0015989 A1* | 1/2004 | Kaizu et al. | 725/39 |
| 2005/0091318 A1* | 4/2005 | Keohane et al. | 709/206 |
| 2005/0197960 A1* | 9/2005 | Daum et al. | 705/52 |
| 2005/0239405 A1* | 10/2005 | Myyry et al. | 455/41.2 |
| 2006/0062544 A1* | 3/2006 | Southwood et al. | 386/46 |
| 2006/0212906 A1* | 9/2006 | Cantalini | 725/62 |

* cited by examiner

*Primary Examiner*—Nick Corsaro
*Assistant Examiner*—German Viana Di Prisco

(57) ABSTRACT

Systems and methods for scheduling audio and/or visual content for recording using a mobile station are provided. A mobile station can display a content guide listing audio and/or visual content. When a dispatch button is depressed, a request for recording of the audio and/or visual content which is currently selected is sent to a server. The server forwards the request to a television device, which schedules the recording of the selected audio and/or visual content. Reminder messages regarding upcoming audio and/or visual content can be sent to the mobile station. If a dispatch button of the mobile station is depressed when the reminder message is being displayed, a request to record the audio and/or visual content identified in the reminder message is sent to the television device.

20 Claims, 6 Drawing Sheets

SYSTEMS AND METHODS FOR SCHEDULING THE RECORDING OF AUDIO AND/OR VISUAL CONTENT

BACKGROUND OF THE INVENTION

In order to increase revenues, wireless network operators are offering an increasing variety of services to mobile stations. For example, some wireless network operators offer music and video on demand. However, most services offered by wireless network operators are designed solely for use by mobile stations. One service offered by wireless network operators which interacts with other devices are picture services. Specifically, some wireless network operators allow pictures captured by a mobile station to be e-mailed to any type of e-mail account, e.g., one which can be access by a computer.

As technology continues to advance, consumers are burdened with a number of technologies which operate independently of each other. For example, although devices for recording audio and/or visual content and computers have coexisted for some time, only recently have consumers been provided with the ability to use computers to remotely schedule the recording of audio and/or visual content. However, in an increasingly mobile society, there will be many times when a consumer is not located near a computer with Internet access, which is required to remotely schedule the recording of audio and/or visual content.

SUMMARY OF THE INVENTION

The present invention provides systems and methods for mobile stations to request that a television device record audio and/or visual content, while providing user-friendly techniques which take advantage of the limited number of buttons on a mobile station. In accordance with the present invention, a dispatch button is used for requesting that audio and/or visual content be scheduled for recording. The mobile station can receive a reminder message that particular audio and/or visual content is upcoming, and depression of the dispatch button while the message is displayed, will send a request that the particular audio and/or visual content be scheduled for recording. Additionally, the mobile station can display a content listing of upcoming audio and/or visual content, and depression of the dispatch button will send a request that selected audio and/or visual content be scheduled for recording. The selected audio and/or visual content can be highlighted content within the content listing or it can be content for which description information is being displayed.

Use of the dispatch button to request that audio and/or visual content be scheduled for recording takes advantage of the limited number of buttons available on mobile stations. Specifically, unlike television remote control devices, mobile stations will not have a dedicated record button. Accordingly, the alternative to the present invention would require a user to navigate through a number of menu items to select particular audio and/or visual content to be scheduled for recording. Specifically, when a user selects a particular audio and/or visual content, the user would be provided with an additional menu, which may provide the option for scheduling the recording of the particular audio and/or visual content. Accordingly, the present invention increases user satisfaction by reducing the number of buttons required to schedule the recording of particular audio and/or visual content.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Most public wireless communications networks, such as cellular communication networks, typically provide interconnect voice communication services. Interconnect voice communication services are what is typically referred to as circuit-switched communications. Accordingly, wireless network operators provide services based on interconnect voice communication services. However, some networks provide both interconnect and dispatch communication services. One such network is the iDEN network, such as the one owned and operated by Nextel Communications, Inc., of Reston Va. Dispatch communication services are commonly referred to as walkie-talkie communication services because of the half-duplex nature of the communications, i.e., only one party may speak at a time.

Figure 1:
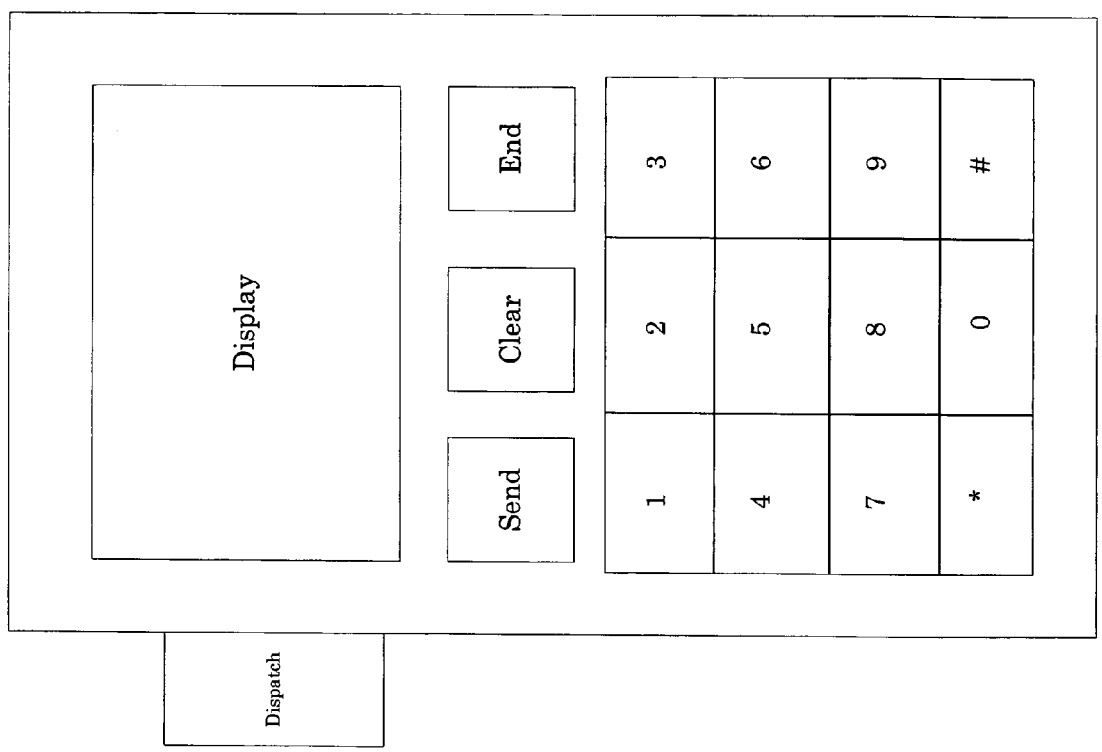
FIG. 1 is a block diagram illustrating an exemplary mobile station capable of performing dispatch communications.

FIG. 1 illustrates an exemplary mobile station capable of performing dispatch communications. A mobile station can be conventional wireless telephones, wireless computers, wireless personal digital assistants (PDAs), and the like. As illustrated in FIG. 1, in addition to the display, numbered keypad, send, clear and end keys, dispatch mobile stations include a dispatch button, commonly referred to as a push-to-send or push-to-talk button. In order to speak during a dispatch communication, the dispatch button must be depressed. As will be described in more detail below, the present invention employs the dispatch button for requesting that particular audio and/or visual content be scheduled for recording. As used herein, audio and/or visual content can be television shows, music programming, radio programming, stored audio and/or visual information, and the like.

Figure 2:
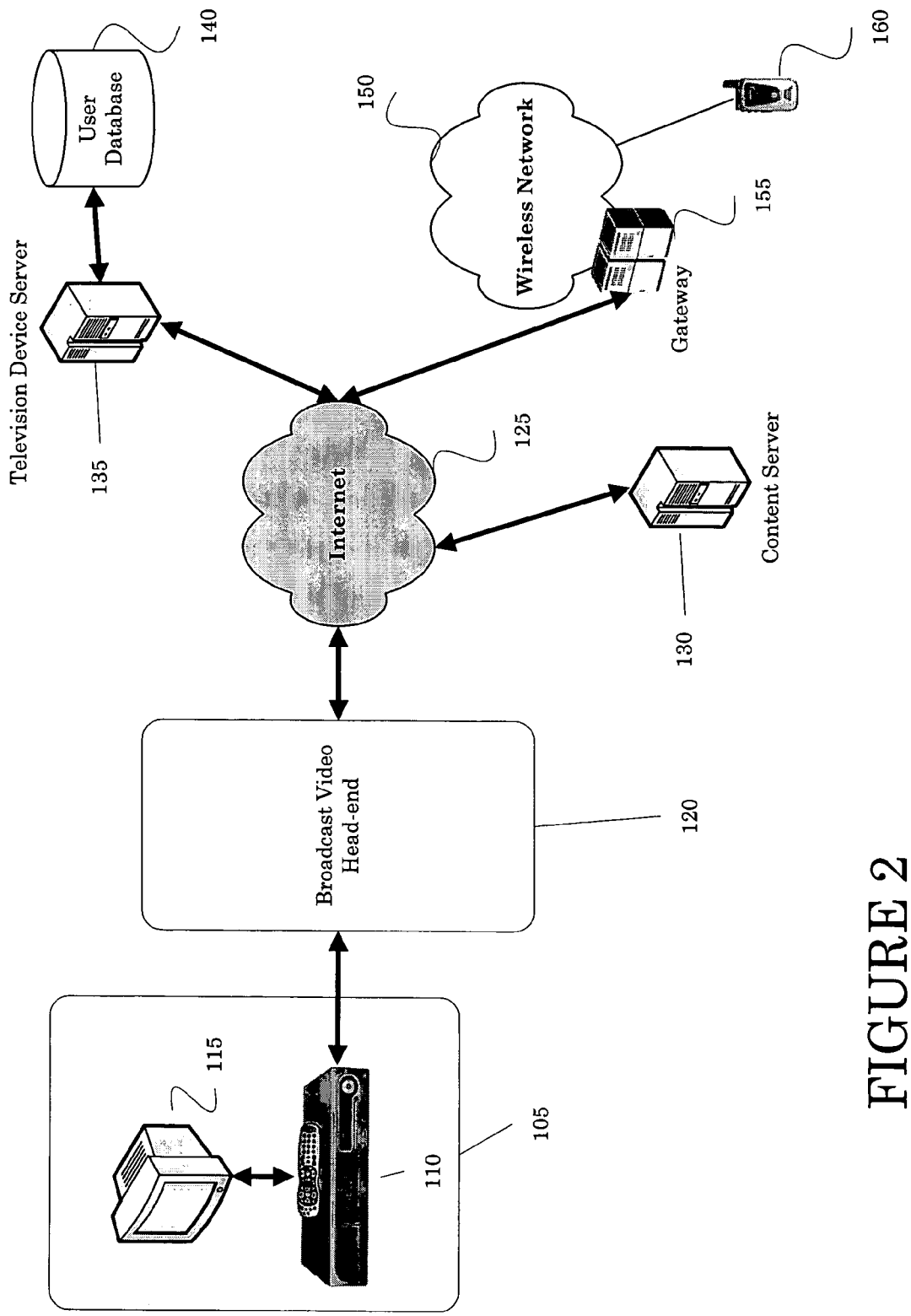
FIG. 2 is a block diagram illustrating an exemplary system for allowing a mobile station to request that audio and/or visual content be scheduled for recording in accordance with the present invention.

FIG. 2 is a block diagram of an exemplary network for allowing a mobile station to request that audio and/or visual content be scheduled for recording in accordance with the present invention. The network includes one or more customer premises 105 coupled to a broadcast video head-end 120, such as a cable, satellite or over-the-air network head-end. Each customer premises includes a television device 110 coupled to a television 115. Although the television device 110 is illustrated as being a component external to the television 115, the television device 110 can be an integral component of the television 115. The television device 110 includes the capability to record audio and/or visual content. For example, the television device can be a digital video recorder (DVR), video cassette recorder (VCR), or the like. If content from broadcast video head-end 120 is encrypted, the television device 110 can include components for decrypting content, or the television device can receive decrypted content from another device (not illustrated) located on the customer premises 105, and coupled to the broadcast video head-end 120.

The broadcast video head-end 120 is coupled to a content server 130, television device server 135 and a wireless network 150 via the Internet 125. Although the content server 130 is illustrated as being coupled to the wireless network 150 via Internet 125, the content server 130 can be a component of the wireless network 150. The broadcast video head-end and the television device server 135 are coupled to the wireless network 150 via one or more gateways 155. The wireless network 150 supports communications for one or more mobile stations 160. The mobile stations 160 include the ability to perform dispatch communications, and include a dispatch button, such as the one illustrated in FIG. 1. The television device server 135 communicates with television device 110, content server 130, and wireless device 160 in order to receive requests from mobile station 160 that audio and/or visual content be scheduled for recording, and sends the instructions to television device 110. The television device server 135 can be a group communication server, such as the one described in U.S. patent application "System and Method for Interactivity Between Mobile Stations and a Television Device" by Tabassi et al., filed on even date herewith. The entire disclosure of the aforementioned patent application is herein expressly incorporated by reference.

In order to provide services to television device 110, the television device server 135 includes a user database 140, which stores information for each subscriber, i.e., each television device 110, such as the mobile stations associated with television device 110 that can request that audio and/or visual content be scheduled for recording by television device 110. The content server 130 stores information related to audio and/or visual content provided by broadcast video head-end 120. This information includes listings of audio and/or visual content and descriptions of the audio and/or visual content. The content server 130 can also store preferences of users of television device 110. Alternatively, user preferences can be stored in user database 140 or television device 110.

Figure 3A:
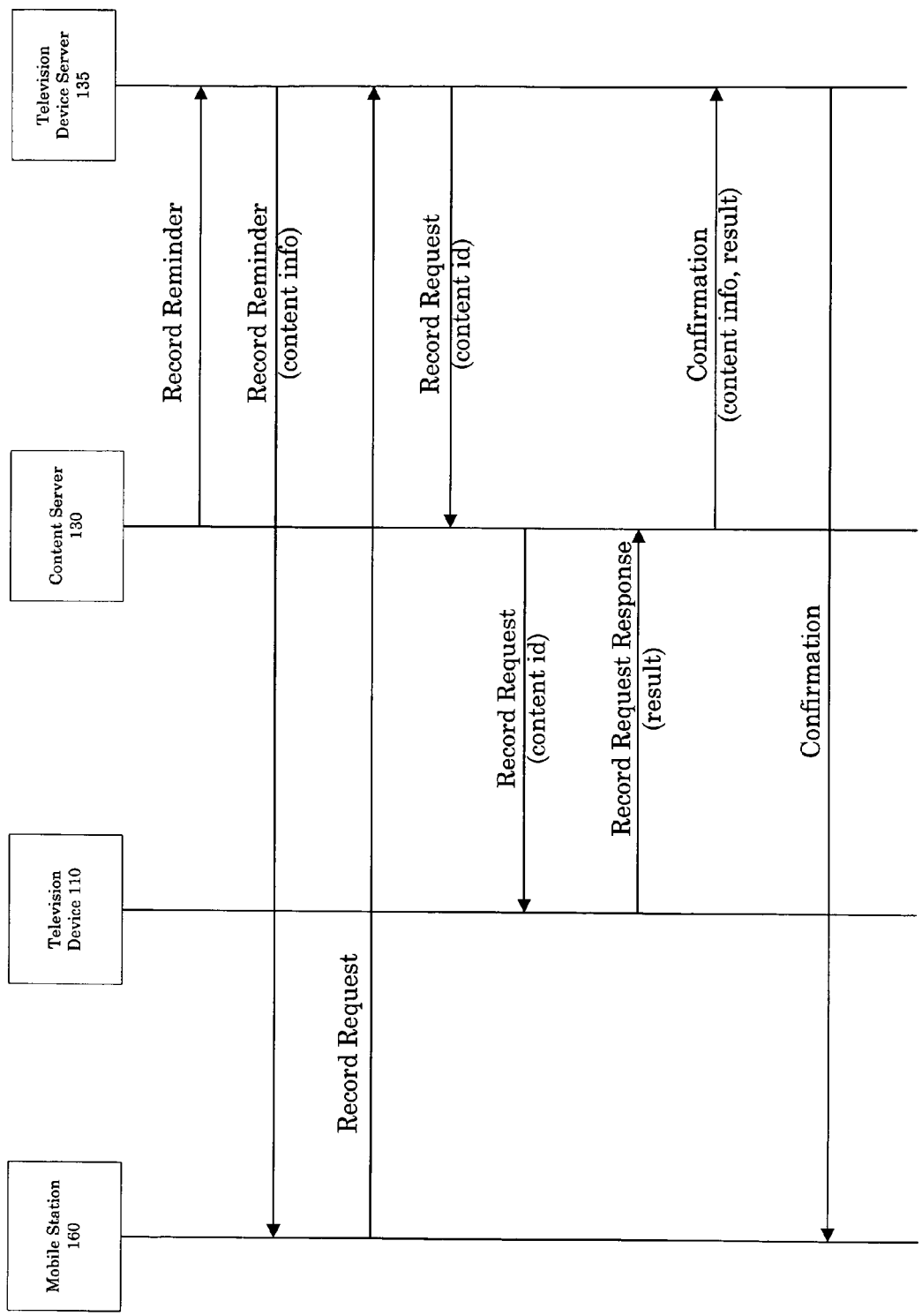
FIG. 3a is an exemplary call flow diagram for recording audio and/or visual content using a mobile station in accordance with one embodiment of the present invention.

The operation system of FIG. 2 will now be described in connection with FIGS. 3a-3c and 4. FIG. 3a is an exemplary call flow diagram for recording audio and/or visual content using a mobile station in accordance with one embodiment of the present invention. In accordance with exemplary embodiments of the present invention, a user can provide the content server with their content preferences, or the content server can automatically determine the content preferences based on the user's previous recordings. The content preferences are general user preferences of the type of content preferred by a user, such as reality shows, sports or the like. However, a user can also set reminders for particular content. Additionally, a mobile station which receives a reminder can forward the reminder to another mobile station.

When content server 130 determines that particular audio and/or visual content matches preferences of a user of television device 110, a predetermined amount of time prior to the broadcast of the content for specific reminders, or when the forwarded reminder is received by the content server 130, the content server 130 sends a Record Reminder, including the content information and a content identification, to television device server 135. The Record Reminder message can be an e-mail with an eXtensible Markup Language (XML) body. The following is an exemplary Record Reminder:

```
TO:                mobileremote@television_device_server.com
FROM:              mobileremote@content_server.com
SUBJECT:           record reminder
<MobileRemote>
    <RecordReminder version=version number>
        <RequestID>022105-12:46:02-456799</RequestID>
        <PhoneNumber>3035551001</PhoneNumber>
        <Channel number="013" name="Channel Name">
            <Show>
                <Name>Show name</Name>
                <Description>Show Description</Description>
                <BeginTime>08:00pm EST</BeginTime>
                <Date>02/25/2005</Date>
                <Duration>60</Duration>
            </Show>
        </Channel>
    </RecordReminder>
</MobileRemote>
```

Television device server 135 has a pool of unallocated dispatch mobile station identifiers, such as the UFMI identifiers used in iDEN, which can be assigned to particular content. The dispatch mobile station identifiers can be assigned to content on a per content, per content and user, or per session basis. The per content basis assigns a single dispatch mobile station identifier for particular content to every mobile station receiving a reminder for the particular content. The per content and user basis assigns a unique dispatch mobile station for particular content for each mobile station. The per session basis assigns a unique dispatch mobile station identifier for particular content for a predetermined amount of time, the expiration of which allows the identifier to be reused. Using any one of the aforementioned techniques, the television device server 135 assigns a dispatch mobile station identifier to the particular content, and sends a Record Reminder message, including the content information and the assigned dispatch mobile station identifier, to mobile station 160. The Record Reminder message can be sent as a short message service (SMS) or multimedia messaging service (MMS) message.

The user of mobile station 160 can review the content information to determine whether the particular content should be scheduled for recording. If the user of mobile station decides that the particular content should be scheduled for recording, the user can actuate the dispatch button, which causes the mobile station 160 to send a Record Request to the television device server 135. The record request can be sent as a dispatch communication with the calling party identifier being the dispatch mobile station identifier included in the Record Reminder message received from television device server 135. The wireless network 150 will recognize that the dispatch mobile station identifier is associated with the television device server 135, and forward the message to the television device server 135.

The television device server 135 then sends a Record Request, including the content identification and identifying the particular television device 110 associated with the mobile station 160, to the content server 130. The Record Request can be an HTTP POST message, which is formatted as follows:

```
<MobileRemote>
    <RecordRequest version=version number>
        <RequestID>022105-12:46:02-456799</RequestID>
        <PhoneNumber>3035551001</PhoneNumber>
        <Channel number="013" name="Channel Name">
            <Show>
                <Name>Show name</Name>
                <Description>Show Description</Description>
                <BeginTime>08:00pm EST</BeginTime>
                <Date>02/25/2005</Date>
                <Duration>60</Duration>
            </Show>
        </Channel>
    </RecordRequest>
</MobileRemote>
```

The content server 130 sends a Record Request, including the content identification, to the television device 110. When the television device 110 has scheduled the recording of the content, a Record Request Response, including a confirmation that the content has been scheduled for recording, is sent to the content server 130. The content server 130 then sends a Confirmation message, including the content information and the confirmation to the television device server 135. The Confirmation message can be an e-mail with an XML body, which is formatted as follows:

```
TO:         mobileremote@television_device_server.com
FROM:       mobileremote@content_server.com
SUBJECT:    record request response
<MobileRemote>
    <RecordConfirm version=version number>
        <Result>200</Result>
        <Description>Recording Confirmed</Description>
        <ResponseID>022105-12:46:02-456800</RequestID>
        <PhoneNumber>3035551001</PhoneNumber>
        <Channel number="013" name="Channel Name">
            <Show>
                <Name>Show name</Name>
                <Description>Show Description</Description>
                <BeginTime>08:00pm EST</BeginTime>
                <Date>02/25/2005</Date>
                <Duration>60</Duration>
            </Show>
        </Channel>
        <Attachment FileName="show.wav" Description=Description/>
    </RecordConfirm>
</MobileRemote>
```

MIME attachment containing .wav and/or gif objects

As illustrated in the exemplary message above, the content server 130 can send audio and/or visual attachments to the television device server 135, for forwarding to the mobile station 160. Alternatively, or additionally, the attachment can be provided by the television device server 135 or another server (not illustrated) that is dedicated to providing wallpaper and/or audio files (e.g., ring tones). The attachments can include information related to the particular content scheduled for recording, such as an audio file of the theme song, a wallpaper picture related to the content, or a short video clip related to the content (e.g., a trailer).

The television device server 135 sends a Confirmation message to mobile station 160. The Confirmation message can be an SMS, or MMS message, and may include the attachments sent from the content server 130. Alternatively, the Confirmation message can be sent as a dispatch communication message, e.g., a prerecorded voice can say "Your selection has been scheduled for recording." Additionally, the dispatch communication message can be related to the content scheduled for recording. For example, the dispatch communication message can be a tag line of the content scheduled for recording, such as words or phrases frequently used by characters in the content scheduled for recording. If the dispatch communication message is related to the content scheduled for recording, the message can be based on an audio file provided by the content server 130. Although not illustrated, if the television device cannot schedule the recording, e.g., due to a time conflict with a previously scheduled recording, the television device 110 will send a confirmation message indicating such, which can be forwarded to the mobile station 160.

Figure 3B:
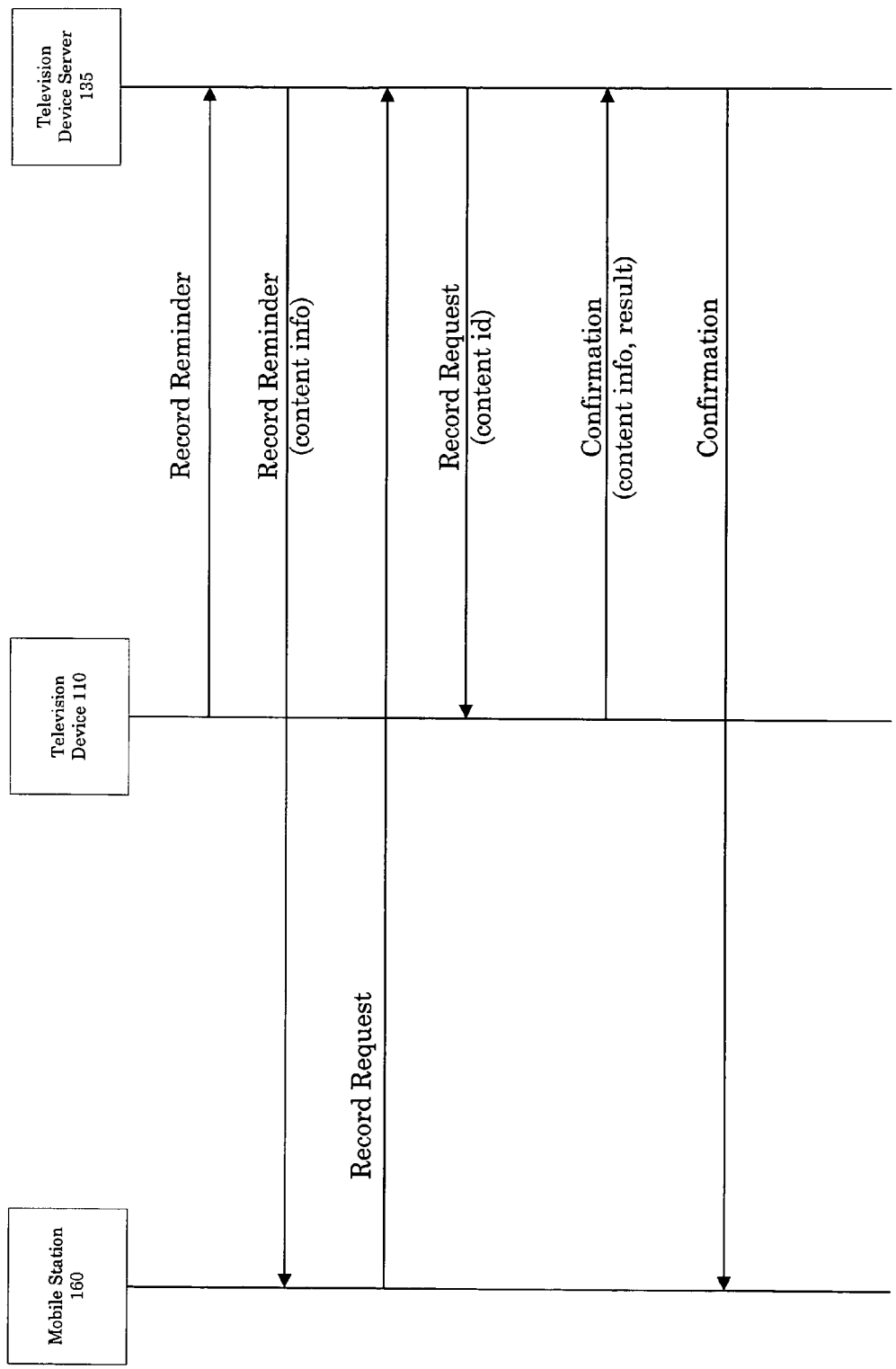
FIG. 3b is an exemplary call flow diagram for recording audio and/or visual content using a mobile station in accordance with another embodiment of the present invention.

FIG. 3b is an exemplary call flow diagram for recording audio and/or visual content using a mobile station in accordance with another embodiment of the present invention. The call flow diagram of FIG. 3b is similar to that of FIG. 3a, except that the content server is not involved. Specifically, the television device 110 forwards the Record Reminder message to the television device server 135, receives the Record Request message from the television device server 135, and sends the Confirmation message to the television device server 135. If the Confirmation message includes an attachment, the television device server can obtain the information for the attachment either from content server 130 or from a local database (not illustrated).

Figure 3C:
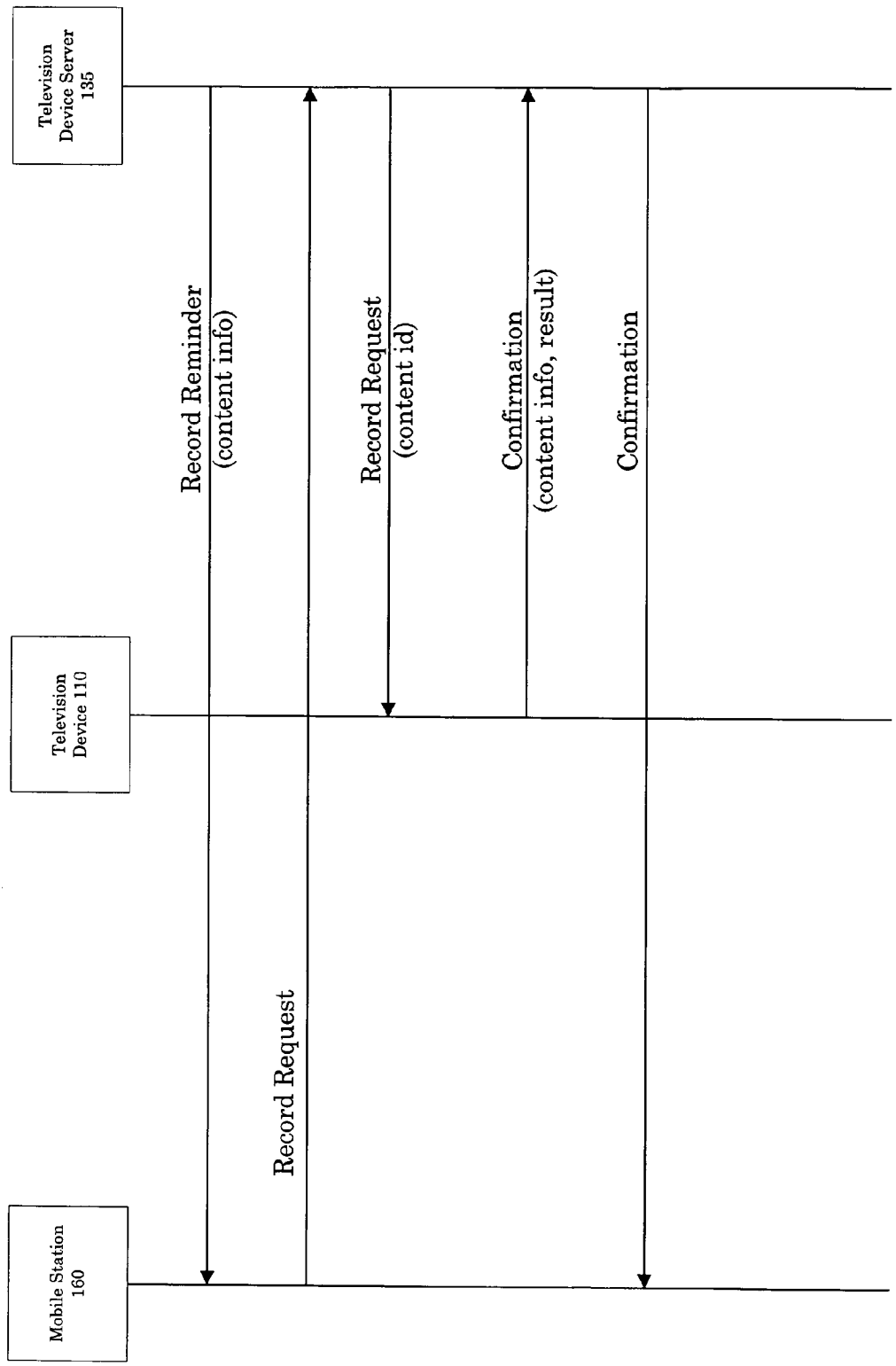
FIG. 3c is an exemplary call flow diagram for recording audio and/or visual content using a mobile station in accordance with yet another embodiment of the present invention.

FIG. 3c is an exemplary call flow diagram for recording audio and/or visual content using a mobile station in accordance with yet another embodiment of the present invention. In accordance with the embodiment illustrated in FIG. 3c, the television device server 135 can store preferences of users of television device 110 in database 140. Accordingly, the television device server 135 will not receive the first Record Reminder message illustrated in FIGS. 3a and 3b. If the Confirmation message includes an attachment, the television device server 135 can obtain the information for the attachment from content server 130, a local database (not illustrated), the television device 135 itself, or another server (not illustrated) that is dedicated to providing wallpaper and/or audio files (e.g., ring tones).

Although FIGS. 3a-3c have been described as assigning a dispatch mobile station identifier to be included in the Record Reminder, and the mobile station sending the Record Request as a dispatch communication, the present invention can also employ interconnect communications for this purpose. Specifically, an interconnect mobile station identifier (i.e., a conventional telephone number) can be assigned to the audio and/or visual content on any of the basis mentioned above, and the mobile station can send the Record Request to the particular interconnect mobile station identifier. Similarly, electronic mail addresses can be used instead of the dispatch mobile station identifiers.

Figure 4:
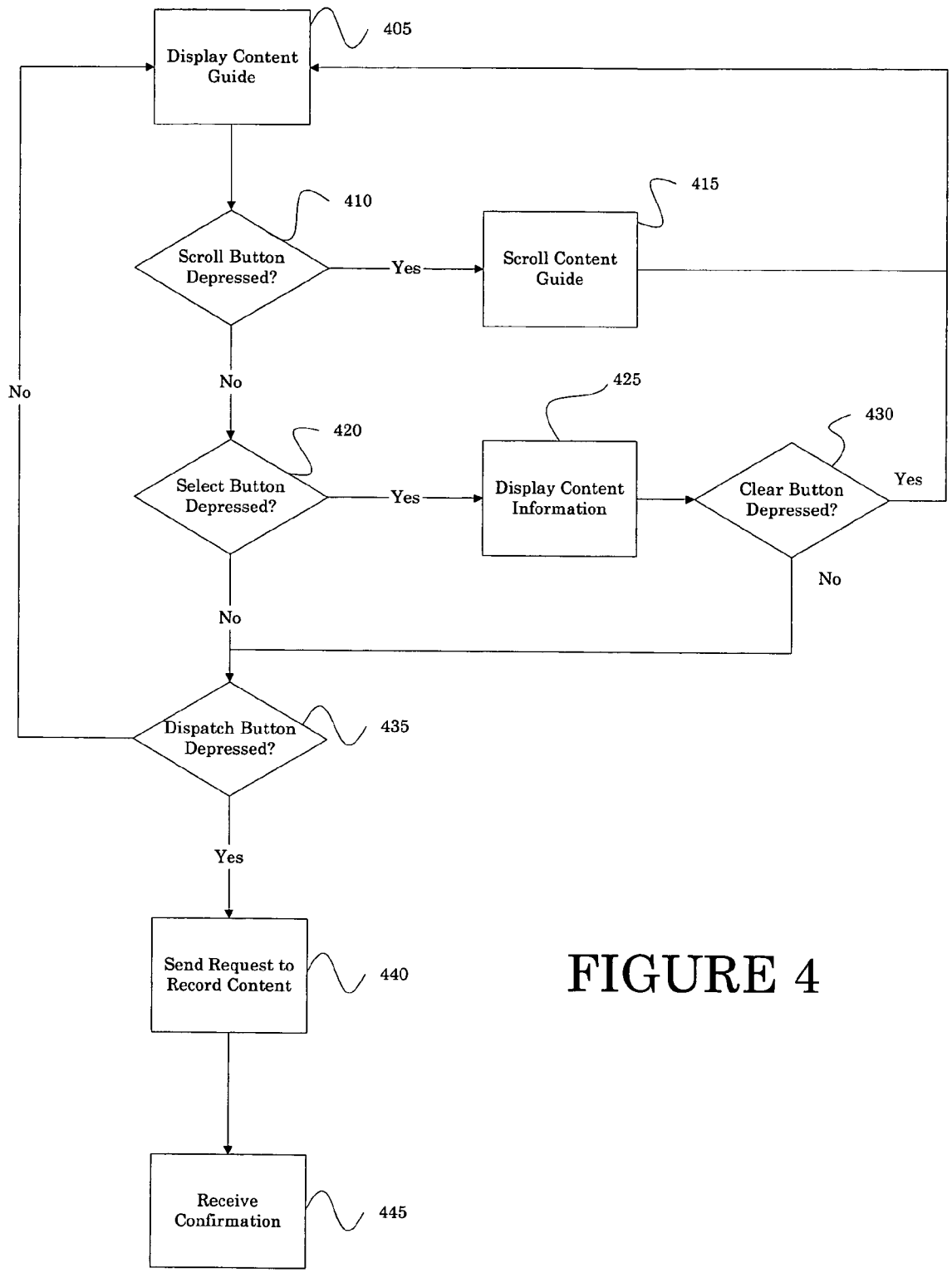
FIG. 4 is a flow diagram illustrating an exemplary method for requesting that a particular audio and/or visual content be scheduled for recording.

FIG. 4 is a flow diagram illustrating an exemplary method for requesting that a particular audio and/or visual content be scheduled for recording. In accordance with the present invention, a mobile station 160 can obtain a content guide from television device server 135, which obtained the content guide from content server 130. Accordingly, the mobile station 160 can display the content guide (step 405) and wait for a command from the user of the mobile station 160. When the scroll button is depressed ("Yes" path out of decision step 410), the mobile station 160 will scroll the display of the content guide (step 415). When the select button is depressed ("Yes" path out of decision step 420), then the mobile station will display information for the content which is currently highlighted in the content guide (step 425). The information can be a description of the selected content and can be downloaded from television device server 135. While the content information is being displayed, if the clear button is depressed ("Yes" path out of decision step 430), then the content guide is displayed (step 405).

When the dispatch button is depressed ("Yes" path out of decision step 435), the mobile station 160 sends a request to record the content that is currently highlighted in the content guide or the content for which the content information is being displayed (step 440). The mobile station then receives confirmation from the television device server 135, that the selected content has been scheduled for recording (step 445). The confirmation message can be the same as that described above in connection with FIGS. 3a-3c, i.e., it can be an SMS or MMS message with audio and/or visual attachments, or it can be a dispatch communication message with an audio confirmation or tag line associated with the content.

Although exemplary embodiments have been described as using particular types of messages and message formats, the present invention can employ other types of messages and message formats.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for scheduling recording of audio and/or visual content using a mobile station, comprising the acts of:
   receiving, by the mobile station, a message identifying a particular audio and/or visual content;
   detecting that a dispatch communication button is depressed;
   transmitting a request to record the particular audio and/or visual content; and
   receiving a confirmation message that the particular audio and/or visual content has been scheduled for recording, wherein the confirmation message includes an attachment that is at least one of
   an audio file that is a theme song of the audio and/or visual content scheduled for recording, and
   a video clip that is a trailer for the audio and/or visual content scheduled for recording.

2. The method of claim 1, wherein the confirmation message is a short message service (SMS) or multimedia messaging service (MMS) message.

3. A method for scheduling recording of audio and/or visual content using a mobile station, comprising the acts of:
   receiving, by a server, a reminder message identifying the mobile station and audio and/or visual content;
   sending a reminder message, including a communication station identifier, from the server to the mobile station;
   receiving, by the server from the mobile station, a request to record the audio and/or visual content, wherein the request to record is addressed to the communication station identifier;
   sending, by the server to a television device, a request to record the audio and/or visual content; and
   receiving a confirmation, by the server from the television device, that the audio and/or visual content is scheduled for recording, wherein the confirmation includes an attachment that is at least one of
   an audio file that is a theme song of the audio and/or visual content scheduled for recording, and
   a video clip that is a trailer for the audio and/or visual content scheduled for recording.

4. The method of claim 3, wherein the server sends the request to record to the television device and receives the confirmation from the television device via a content server.

5. The method of claim 3, wherein the server receives the reminder message from the television device.

6. The method of claim 3, wherein the server receives the reminder message from a content server.

7. The method of claim 3, wherein the server receives the reminder message from a user database.

8. The method of claim 3, further comprising the acts of:
   sending, from the server to the mobile station, a confirmation that the audio and/or visual content is scheduled for recording.

9. The method of claim 8, wherein the confirmation is a short message service (SMS) or multimedia messaging service (MMS) message.

10. The method of claim 3, wherein the communication station identifier is a dispatch mobile station identifier selected from a plurality of dispatch mobile station identifiers.

11. The method of claim 10, wherein the request to record received by the server from the mobile station is a dispatch communication addressed to the dispatch mobile station identifier.

12. A method for scheduling recording of audio and/or visual content using a mobile station, comprising the acts of:
   determining that a reminder message is to be sent to a particular mobile station for particular audio and/or visual content;
   assigning a communication station identifier from a group of communication station identifiers;
   sending a reminder message to a mobile station, wherein the message includes the assigned communication station identifier;
   receiving a response to the reminder message, wherein the response is addressed to the assigned communication station identifier; and
   sending a confirmation message to the mobile station, wherein the confirmation message includes an attachment that is at least one of
   an audio file that is a theme song of the audio and/or visual content scheduled for recording, and
   a video clip that is a trailer for the audio and/or visual content scheduled for recording.

13. The method of claim 12, wherein the communication station identifiers are dispatch station identifiers, and the response to the reminder message is a dispatch communication.

14. The method of claim 12, wherein the communication station identifiers are interconnect station identifiers, and the response to the reminder message is an interconnect communication.

15. The method of claim 12, wherein the communication station identifiers are electronic mail identifiers, and the response to the reminder message is an electronic mail communication.

16. The method of claim 12, wherein the reminder message is a short message service (SMS) or multimedia messaging service (MMS) message.

17. The method of claim 12, wherein the communication station identifiers are assigned on a per content basis.

18. The method of claim 12, wherein the communication station identifiers are assigned on a per content and mobile station basis.

19. The method of claim 12, wherein the communication station identifiers are assigned on a per session basis.

20. A method for scheduling recording of audio and/or visual content using a mobile station, comprising the acts of:
- receiving, by the mobile station, a message identifying a particular audio and/or visual content;
- detecting that a dispatch communication button is depressed;
- transmitting a request to record the particular audio and/or visual content; and
- receiving a confirmation message that the particular audio and/or visual content has been scheduled for recording, wherein the confirmation message is a dispatch communication message with audio that is a tag line of the audio and/or visual content scheduled for recording.

* * * * *